W. BRAY.
Traction-Wheel.
No. 23,289.    Patented Mar. 22, 1859.
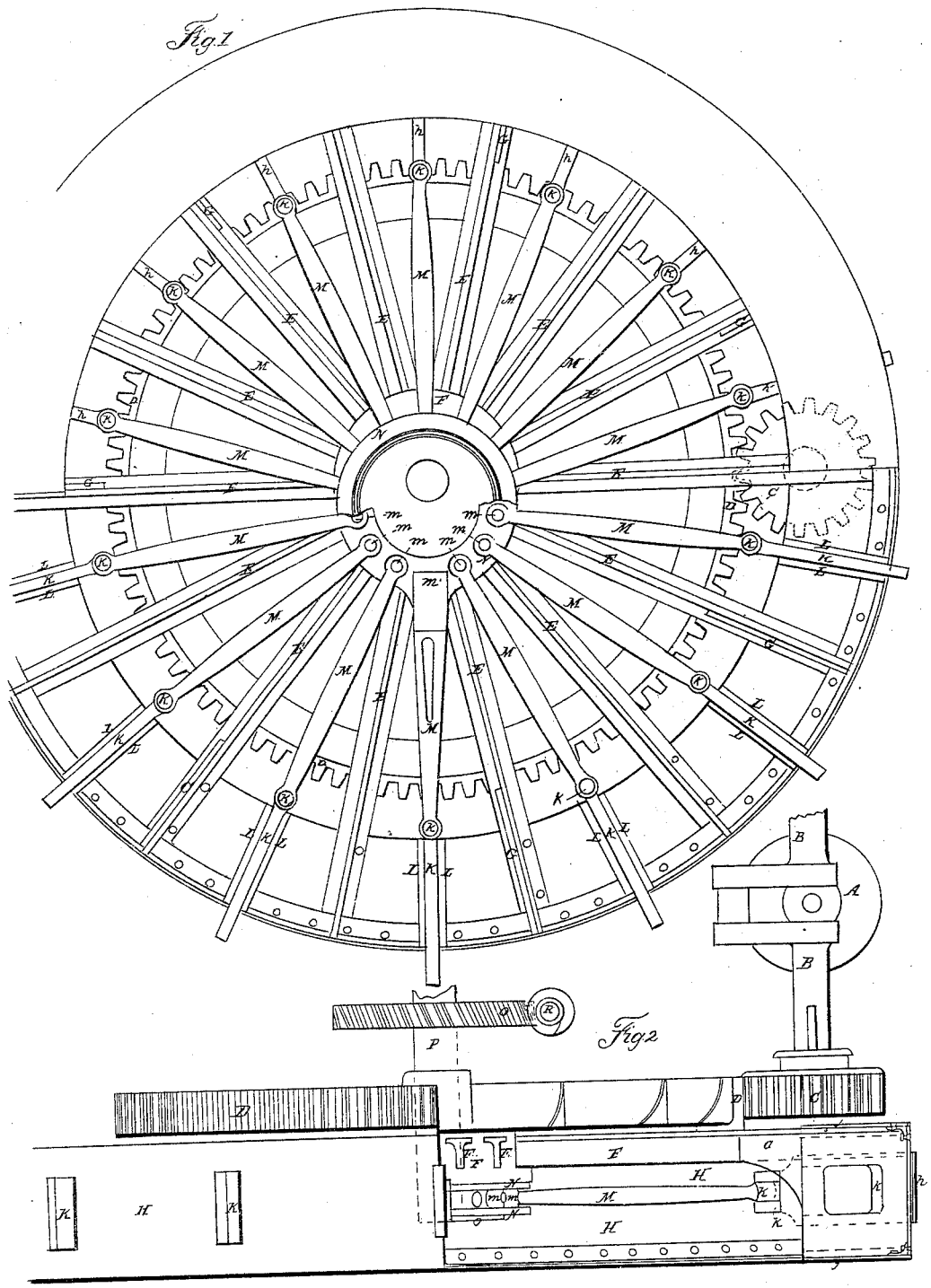

UNITED STATES PATENT OFFICE.

WILLIAM BRAY, OF FOLKSTONE, ENGLAND.

WHEEL OF TRACTION-ENGINES.

Specification of Letters Patent No. 23,289, dated March 22, 1859.

*To all whom it may concern:*

Be it known that I, WILLIAM BRAY, of Folkstone, in England, a subject of the Queen of Great Britain, have invented new and useful Improvements in Traction-Engines; and I do hereby declare that the following is a full, clear, and exact description thereof, reference being had to the accompanying drawings, which makes a part of this specification.

The wheels of traction engines adapted for plowing or dragging weights over soft ground have not sufficient hold upon the ground, if constructed in the ordinary manner. By my improvements I construct the wheels with teeth or blades which enter the ground and obtain a firm hold. These teeth are made to slide or move in and out by an eccentric or other mechanical means, so that they clear themselves of the soil and are again ready to enter the ground. The eccentric is capable of adjustment so that the projection of the teeth at the bottom of the wheel may be varied, and the wheel may at pleasure be made to act like an ordinary wheel. This adjustment enables the wheels to run well upon hard ground when required.

Figure 1 of the accompanying drawing is a side view, partly in section, of the wheel of a traction engine constructed according to my invention; Fig. 2 is a plan, partly in section, of the same, and also shows a portion of the engine shaft and one of the steam cylinders.

The piston of the steam cylinder A drives the crank shaft B, and another cylinder and piston drive another crank on the same shaft, and placed at right angles to the first crank, in the ordinary manner.

The boiler and other details of the engine, which are not shown, are constructed in any of the ordinary or known manners.

Each end of the shaft B carries a pinion C, which drives a toothed wheel or ring D fixed on the driving wheel, which is constructed in the following manner; E E E are the spokes, of tee iron, which are fixed in the boss or nave F and connected by rivets and by bracket plates G G to the trough-shaped tire or ring, which consists of a cylindrical hoop H with two side plates or rings I J connected to it by rivets and angle irons or otherwise.

K K are the teeth or blades which slide between guide plates L L fixed in the tire. These blades are connected by joints $k$ $k$ to rods M M, which are jointed at their other ends $m$ $m$ to two rings N N encircling the eccentric O. One of the rods M' is however connected rigidly to the rings N at $m'$, so as to cause the ring to revolve with the wheel. The eccentric O is fixed upon the shaft or axle P, on which the boss or nave F is free to revolve. The axle P carries a worm wheel Q gearing into an endless screw R. By turning the screw R by hand, the axle P may be turned around, so as to bring the eccentric O into different positions. When the eccentric is in the position shown in the drawing, the blades or teeth K K are caused to protrude as they descend to the ground by the revolution of the wheel, and to be drawn in as they ascend. By this means the blades or teeth obtain a firm hold in the ground, which enables the traction engine to drag the plows or wagons or other articles which may be attached to it.

The broad hoop H obtains sufficient bearing upon the ground to support the weight of the engine, and the side rings I J prevent the earth from getting over the hoop H. The inner edges of the rings I J may be connected by another hoop, so as to make the tire of the form of a rectangular box instead of a trough; the earth cannot then get into it. As the wheel revolves, the blades are drawn in as they pass over the upper part of the wheel and are thus cleared from the earth which adheres to them, and they are again protruded as they descend.

The extent to which the blades enter the ground may be varied, according to the nature of the ground and other circumstances, by shifting the eccentric so as to cause the point of greatest protrusion to be at some other point than the bottom of the wheel. By turning the eccentric half around, the blades will be protruded at the top of the wheel, and will be drawn into the wheel at the lower part. The engine can then travel along a hard road or surface as though the wheels were of the ordinary construction.

The details of the machinery admit of variation. Thus the blades or teeth K K may be either flat blades or a series of prongs or spikes. They may also be connected rigidly to the rods M M without the intervention of the joints $k$ $k$, and in that case the guide plates L L are dispensed with, or are made to extend but a short distance within the hoop H, and are rather loosely fitted to the blades, so as to allow of the slight angular motion which the blades receive from the rods M M. The wheel is shown with one boss or nave and one set of spokes, but it may be made with two bosses or naves and two sets of spokes, one boss and set of spokes being placed on each side of the eccentric O. Or the eccentric may be placed outside the wheel instead of within it, and the rods M M may then pass between the spokes. The eccentric and the wheel Q may be mounted on a loose boss or collar, and the driving wheel may be fixed on the axle, or both may be loose on the axle, which may then be permanently fixed. A cam or a crank may also be used in lieu of the eccentric. The crank pin or the eccentric or the cam may also be made adjustable so as to vary the eccentricity, or to bring it into a position concentric with the wheel when required. Thus if the parts be so proportioned that the blades may not protrude when the eccentric is shifted into the concentric position, the driving wheel may be employed to communicate motion to threshing machines or other machinery by means of a belt or strap passing around it, the engine being blocked up or supported so that the wheel may not touch the ground. As however it will generally be advisable to reduce the speed of the engine to the driving wheel by means of the pinion C and wheel or toothed ring D, I prefer to apply a separate pulley on the engine shaft B for communicating motion to machinery when required. The pinion C is driven by a feather or a square part on the shaft B, and is capable of being slid along it so as to draw it out or put it in gear with the wheel or ring D. Or the shaft B may carry friction clutches or other clutches for connecting and disconnecting the pinions instead of sliding them in and out of gear. The shaft B can thus revolve independently of the driving wheels when required. Moreover both wheels can be driven while the engine is advancing in a straight line, and the wheels will then tend to keep it to a straight course. On the other hand, when it is required to turn or go around a curve the wheel on the inner side or smaller radius of the curve is disconnected, while the outer wheel is kept in gear, and the engine is thus enabled to turn with facility.

When the engine is employed to drive a threshing machine or other machinery, both wheels are disconnected, and the eccentrics may be set so as to cause the blades to protrude at the lower part and assist in scotching the wheels or preventing the engine from shifting from its place. The wheels may be constructed so that the blades or teeth are actuated by a spiral or other cam mounted on the wheel itself. By turning or shifting this cam on the wheel the blades may be all protruded simultaneously when the engine has to travel over soft ground, and they may be all withdrawn simultaneously when it has to travel on hard ground. The engine may be constructed with two driving wheels and one or two steering wheels. When it is supported on only three wheels, all the wheels will bear upon the ground, notwithstanding its being uneven. The same effect may be obtained with four wheels, by supporting the engine on the two driving wheels, and on a joint or pivot on the center of the axle of the two steering wheels, which are thus left free to accommodate themselves to the inequalities of the surface of the ground.

The engine may be made with only one driving wheel constructed as hereinbefore described; but by employing two wheels with the connecting and disconnecting apparatus hereinbefore described, the engine obtains a greater hold on the ground, and can also be turned around in either direction with facility.

Having now described the nature of my invention and in what manner the same is to be performed, I wish it to be understood that what I claim is—

Constructing traction engines with driving wheels with blades or teeth which are capable of being protruded and withdrawn substantially as hereinbefore described.

In testimony whereof I have signed my name to this specification before two subscribing witnesses.

WILLIAM BRAY.

Witnesses:
CHARLES COWPER,
JOHN R. DARKER.